United States Patent [19]

Cogswell et al.

[11] Patent Number: 5,066,536

[45] Date of Patent: Nov. 19, 1991

[54] FIBRE REINFORCED THERMOPLASTIC COMPOSITE STRUCTURES

[75] Inventors: Frederic N. Cogswell, Guisborough; Peter J. Meakin, Saltburn, both of England

[73] Assignee: Imperial Chemical Industries PLC, London, England

[21] Appl. No.: 280,355

[22] Filed: Dec. 6, 1988

[30] Foreign Application Priority Data

Dec. 10, 1987 [GB] United Kingdom ............... 8728887

[51] Int. Cl.$^5$ .......................... B32B 7/02; D04H 1/58
[52] U.S. Cl. .................................... 428/216; 428/292; 428/401; 428/473.5; 428/474.9; 428/475.2; 428/480; 428/482; 156/311
[58] Field of Search ..................... 428/216, 292, 473.5, 428/474.9, 475.2, 480, 482, 401

[56] References Cited

U.S. PATENT DOCUMENTS

| 4,604,319 | 8/1986 | Evans et al. | 428/473.5 |
| 4,666,547 | 5/1987 | Snowden, Jr. et al. | 428/473.5 |
| 4,767,656 | 8/1988 | Chee et al. | 428/473.5 |

Primary Examiner—P. C. Sluby
Attorney, Agent, or Firm—Cushman, Darby & Cushman

[57] ABSTRACT

A structural thermoplastic composite material comprises a laminate of a first layer of a fibre reinforced thermoformable polymer composite containing reinforcing filaments and an adherent layer of a second thermoformable polymer. The thermoformable polymer of the adherent layer comprises either a crystalline polymer having a melting point at least 10° C. below that of the first layer, or is an amorphous polymer having a glass transition temperature which is at least 10° C. lower than the melting point of the polymer of the first layer, or is an amorphous polymer which may be crystallizable in a subsquent annealing process. The adherent layer is applied to the first layer at a temperature above the melting point of the thermoformable polymer of the first layer.

13 Claims, No Drawings

FIBRE REINFORCED THERMOPLASTIC COMPOSITE STRUCTURES

This invention relates to fibre reinforced thermoplastic composites and more particularly to such composite structures in a form which may be joined together or to other structural materials, particularly those based on thermoplastics.

There is a rapidly growing interest in the use of fibre reinforced thermoplastics composite materials as materials of construction because of the excellent physical properties inherent in fibrous material such as glass, carbon, boron and alumina fibres. Production techniques have now been developed for impregnating these fibres, particularly when in the form of continuous rovings, with thermoplastics so that the multitudinous individual filaments of the rovings are substantially completely wetted by the thermoplastics resulting in composites being obtained which maximise the effect of the presence of the fibres in the composite. By ensuring effective wetting of the individual filaments composites have been prepared from a variety of thermoplastic materials in which the contributions of the properties of the fibres and the thermoplastic materials have been maximised. The preparation of typical thermoplastic composites is described in European Patent Publication No. 56703. Of particular interest are the reinforced composites of polyarylethers (both amorphous and crystalline), especially polyetherketones and polyethersulphones. The development of carbon fibre reinforced polyetheretherketone composite material has shown promise of meeting the exacting requirements of a constructional material for the aerospace industry.

For a variety of reasons, such as the need to reduce costs and to fabricate lighter structures it is becoming desirable to provide materials which can be conveniently joined together or to other materials of construction. Although by the nature of the thermoplastics materials they can be joined together by the application of sufficient heat and pressure this is not a suitable technical or economical solution to the problem for many applications.

The main problems that arise result from those properties that give the composites their desirable properties. Thus the problem is one of joining materials which are exceptionally stiff and have a high volume content of reinforced fibres, usually continuous, collimated filaments. The high volume content of fibres results in relatively little polymer being available at the surfaces of the work pieces to be joined. If the conventional procedure of applying pressure to heat-softened work pieces is employed so as to squeeze molten polymer to the surfaces it is found that not only are very high forces needed, particularly when blocks of substantial thickness need to be joined together, but that the thermoplastic matrix will tend to flow out of the edges of the work pieces under compression, thus disrupting the disposition of the filaments within the block of composite material. Also, because both work pieces are heated to their respective melt temperatures, intricate bond jigging is required to maintain the exact shape of the individual work pieces during heat up and cool down. Alternative procedures of trying to apply adhesive layers on the surface of the work pieces which again are intended to be effective under heat and pressure are similarly cumbersome and can be ineffective. If a thin layer of hot melt adhesive is applied at a temperature at which the polymer of the composite is not molten it is found that it is not possible using any reasonable pressure to bring the surfaces into sufficiently good contact to obtain good bonding. This difficulty arises because of the relatively imperfect nature of the surface flatness and the stiffness of the composite.

A structural composite material has now been developed which is useful as a component material in larger structures enabling joining to be effected in an improved manner.

According to the invention there is provided a structural thermoplastic composite material comprising a laminate of a first layer of a fibre reinforced thermoformable polymer composite containing reinforcing filaments at least 50% by weight of which have a length in excess of 3 mm and an adherent layer of a second thermoformable polymer which comprise either a crystalline polymer having a melting point at least 10° C. below that of the polymer of first layer, or is an amorphous polymer having a glass transition temperature which is at least 10° C. lower than the melting point of the polymer of the first layer, or is an amorphous polymer which may be crystallisable in a subsequent annealing process and wherein the adherent layer has been applied to the first layer at a temperature above the melting point of the thermoformable polymer of the first layer.

By a "thermoformable polymer" is meant that the polymer should have sufficient melt flow to permit the polymer to be shaped at an elevated temperature below the temperatures at which the polymer thermally degrades. Generally the polymer will be a true thermoplastic material but the term includes those polymers which although of a thermosetting nature can exist as melts and retain sufficient melt flow to be shaped at elevated temperatures before cross-linking reactions render the polymer no longer melt processible or melt fusible.

It should be noted that melting points and glass transition temperatures can be depressed by the inclusion of certain additives such as plasticisers and solvents. When such materials are present the melting point or glass transition temperature are to be taken as that of the mixture and not simply the polymer component.

A major advantage of the provision of such a structural composite laminate is that it is possible to join such elements together, by bringing together corresponding areas of the adherent layer on the work pieces to be joined at a temperature above the melting point or glass transition of the adherent layer but below the melting temperature of the first polymer of the work piece. In this way it is possible to effect welding with the major benefit of not disturbing the orientation of the reinforcing filaments in the structural composite layer. With preferred materials of construction the joint has the nature of a weld rather than a simple adhesive interface because the method results in molecular migration across the interface of the surfaces being joined. The composite laminate may also be used to form structures in which it is used as a protective surfacing material or adherent layer is a protective layer and it may be joined to other materials which are space filling systems, such as honeycomb structures or foamed structures. Some thermoplastic materials have exceptionally good bonding to metals and in appropriate cases the laminate of the invention can be bonded to metals and other dissimilar materials such as thermoset or thermoplastic materials or other materials.

Additionally, structural composite laminates in accordance with the invention can be used to repair structural articles which are made from fibre reinforced thermoformable polymers. In that instance, an adherent layer of an areal extent at least sufficient to cover the site of the damage is applied to an article and then a structural composite material is joined to that layer by its own corresponding adherent layer.

The laminate structures of the invention are particularly useful when it is desired to produce an article having the known benefits of thermoplastic materials including a tolerance to damage and environmental resistance, including a useful resistance to solvents.

It is preferred that the first layer of reinforced composite is reinforced with continuous, aligned filaments. The production of suitable prepreg is described in European Patent Publication No. 56703. As described, when the unidirectionally reinforced composite prepreg is produced in the form of thin sheet is it suitable for laying up with the filaments in any required direction in the plane of the sheet lay up so that after consolidation under heat and pressure a reinforced sheet results. This composite is suitable for use in forming the laminate of the present invention particularly when the thermoplastic matrix is a crystalline polymer.

The composite body of the first layer may have been formed from a lay-up of prepreg reinforced with unidirectional, continuous aligned fibres or may consist of impregnated woven fabrics in which continuous, aligned fibres are present and aligned in more than one direction in the fabric, the polymer impregnating the fabric to form the thermoplastic matrix again preferably being a thermoformable crystalline polymer.

When the reinforcement in the first layer does not consist of continuous, aligned filaments it is preferred that the precursor for the reinforced material of the first layer is a material which has been obtained by impregnating continuous filaments to such an extent that the longitudinal flexural modulus of the composite is at least 70% and preferably at least 90% of that theoretically attainable, thereby indicating a high degree of wetting of individual filaments by the thermoplastic polymer. Such a material, if not used in the form of continuous, aligned fibres as indicated above, may be chopped into short lengths, for example from 3 mm to 100 mm long, and fabricated by a number of techniques into a reinforced composite sheet. The advantage of such a procedure is that these well wetted products may be fabricated in processes which involve melt homogenising the pellets, with a surprising retention of the filament length of the original pellets. Suitable processes include injection moulding or extrusion. A preferred method for utilising the chopped product and retaining fibre length is extrusion of lengths of reinforced products of lengths of about 10 to 50 mm into an open chamber. This operation gives rise to a reinforced structure containing extensive voiding as a result of the relatively long fibres relaxing on emergence from the die. Compression of this foam gives rise to an article containing randomly dispersed, individual filaments of lengths not greatly reduced with respect to the length of the original pellets. By this procedure it is relatively easy to obtain articles containing filaments at least 50% by weight of which are at least 3 mm long and generally at least 10 mm long.

Suitable polymers for the first layer of the laminate include crystalline polymers derived from propylene, polyesters, including polyesters capable of forming anisotropic melts, polyamides and crystalline poly aryl ethers, particularly polyether ketones polyether ketone and polyether ether ketones and others and amorphous polymers such as polyether sulphones and others.

The adherent layer of the laminate will contain a crystalline polymer which has a lower melting point than that of the first layer crystalline polymer or may be an amorphous polymer of lower Tg than the melting point of the first layer polymer or may be an amorphous polymer which may be crystallisable in a subsequent annealing process.

In the instance of an amorphous polymer, as previously stated the Tg is at least 10° C. below the melting point of the first layer polymer, but preferably is at least 30° C. and most preferably at least 100° C., below that melting point. Additionally, when the polymer of the first layer is crystalline, the Tg of the adherent layer is preferably greater than the Tg of the polymer of the first layer. The polymer of the adherent layer may be unreinforced or may have similar reinforcement to that of the first layer depending on the application envisaged for the laminate. Whether or not it contains reinforcing reinforcing fibres it may contain additives for specific purposes such as for improving thermal stability, particulate additives for controlling stiffness and shrinkage or fire retardants.

Suitable crystalline polymers for use in the adherent layer must have a melting point at least 10° C. lower than the crystalline polymer chosen for the first layer and include copolymers of the polymer chosen for the first layer. For example, if the polymer in the fibre reinforced composite is polyethylene terephthalate a suitable adherent layer includes copolyesters of polyethylene terephthalate formed by the inclusion of isophthalate moieties in addition to the terephthalate moieties thereby lowering the melting point with respect to polyethylene terephthalate.

Poly(aryl ethers) and copolymers thereof can be chosen to provide the necessary difference in melting point. A particularly useful combination of compatible high performance polymer materials are the polyaryl ethers described in European Patent Publication No. 194 062 and the polyetheretherketone described in European Patent No. 1879. The latter materials having the repeat unit

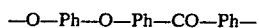

generally have lower melting point and glass transition temperature than those typical of European Patent 194 062 which contain repeating units of the structure

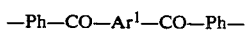     IA together with units of the structure

     IB wherein IA and IB are linked through ether linkages
Ph is a phenylene group;
Ar¹ is a polyaromatic group containing at least two aromatic groups directly linked together; and
Ar² is a group Ph or is a polyaromatic group containing at least two aromatic groups which are either directly linked together or are linked together by —CO— or —SO— groups, wherein at least some of the groups $Ar^2$ contain a group —$SO_2$—.

Suitable polyarylethersulphones are described in European Patent Publication No. 235885.

According to one particular aspect of the invention the particular combination of first layer polymer and adherent layer polymer should be chosen with maximum compatibility in mind. Whether or not, the polymer of the first layer and the adherent layer are compatible is determined by whether a blend of the two polymers exhibits a single peak characteristic of the glass transition temperature when examined by differential scanning calorimetry (DSC).

Suitable amorphous polymers preferably have a Tg in excess of 100° C. and include amorphous polysulphones and polyethersulphones, polyetherimides, amorphous polyamides and others. The adherent polymer may also be in amorphous polymer form but which is capable of being crystallised in an annealing process.

The adherent layer may comprise a polymer blend, for example a blend of an amorphous polymer and the polymer of the first layer.

The adherent layer may be applied to the fibre reinforced composite in a number of ways. For example, preformed films of a suitable adherent polymer may be applied on a surface of the composite material. Such films will be typically of the order of 50 to 200 microns thick and will be consolidated onto the composite by pressure whilst the composite is at a temperature above the melting point of the matrix polymer of the composite at least at the surface of the composite in contact with the adherent layer. Surprisingly, we find there is a tendency for fibres to migrate into the adherent layer during this process. We believe this may be a significant factor in establishing good bond strength.

An adherent layer may also be applied from solution where the polymer is soluble in a convenient solvent, prior to the solvent being volatilised and the temperature of the composite, at least in the regions contacting the applied film, being raised above the melting point of the polymer of the composite.

When the reinforced composite is a body of material formed from a lay-up of unidirectionally reinforced prepreg layers, with the fibre orientation of the successive layers positioned so as to provide quasi-isotropic reinforcement it is convenient that the adherent layer is itself a reinforced prepreg layer, preferably a unidirectionally reinforced prepreg layer, bonded to the composite body by consolidation under heat and pressure, the conditions being sufficient to melt at least the surface layer of the composite body in contact with the adherent prepreg composite layer. The adherent prepreg composite layer may have been produced by the same type of impregnation processes as the prepregs in the bulk composite body, for example using the procedures described in European Patent No. 56703.

The structural composite materials of the invention carrying their melt bonded adhesive layer can be bonded to each other or to other structural materials at temperatures lower than those which would cause melting of the polymer of the composite body. The joining procedure is typically carried out in a press, an autoclave or locally welded with hot blocks or automated welding equipment (induction or convection heat sources). The bonded article is handlable after cooling to a temperature below the melting point of the adherent layer when the adherent layer is a crystalline polymer or below the Tg of the polymer of the adherent layer when the adherent layer is an amorphous polymer. At the stage of making the bond, it is desirable to protect the adherent layer from degradation—promoting agents such as oxygen in air, catalytic metals etc. and to avoid excessive dwell at the bonding temperature. This ability to effect joining at temperatures which do not require the whole polymer of the composite to be molten is a substantial advantage in avoiding the need for lengthy holding times at the bonding temperature particularly where the composite body is large in dimensions.

Surprisingly, although the method of the invention does not require remelting of the polymer of the reinforced composite bodies to be joined, exceptionally good bond strengths can be obtained. It is possible to achieve a bond strength which is at least 70% and usually at least 80% of the shear strength of the bulk composite material being joined. It is not unusual to find in the bond strength testing that the bond is stronger than the bulk composite material, i.e. the fracture line passes through the composite rather than along the interface between the joined bodies.

Another particularly useful aspect of the invention is that the bond line thickness can be manipulated by interposing additional films of the polymer used in the adherent layer between the components to be joined. Such manipulation is particularly useful for ensuring the gap between the components is properly filled, particularly when fabricating large structures the components for which may have a relatively large variation in dimensions over the surfaces to be joined. In this instance, the bonding can be monitored by monitoring the "fillet" of excess polymer being squeezed from between the components. When the fillet stops growing, "high spots" on the components are in contact with one another.

A particularly useful aspect of the present invention is that because controlled cooling is not necessary in order to retain the properties of the composite, procedures of joining in which the join can be made by successively making joins of small area relative to the total area to be joined until the total area has been joined. This enables joining to be effected over large area work pieces for which no suitable pressing or automated welding equipment is available. Joins which could not be made by simple pressing between opposing plates because of the geometry of the work pieces can also be effected in this manner. Typically, the successive joining can be effected using an induction heater with pressure which is indexed to successively cover the whole area required to be joined.

The laminates of the invention are effective when used in a process in which the adherent layer is a structural foam or is caused to foam as part of the adhesion process when the laminate is adhered to other members. This may be achieved by swelling the adherent layer of amorphous polymer with a suitable solvent which is subsequently volatilised by heating the composite laminate to an elevated temperature at which the solvent boils whilst the laminate is in contact under light pressure with the member to which it is to be adhered. The composite with its foamed layer and contacting member is then heated to a temperature above the Tg of the amorphous polymer. At this stage the foam will collapse. It may be advantageous to include a cross-linking agent dissolved in the solvent so that after the volatilisation of solvent the bonded interlayer may be cross-linked during the heat bonding process. This procedure is particularly useful when the member to which the laminate is to be bonded is a honeycomb material.

The invention is further illustrated with reference to the following examples.

EXAMPLE 1

Four layers (each 100 mm×100 mm) of a reinforced thermoplastic prepreg obtainable from Imperial Chemical Industries PLC as 'Victrex' APC 2 and consisting of 68% by weight of uniaxially aligned carbon fibres in a matrix of polyether etherketone (PEEK) polymer (Tg=143° C.: Tm=343° C.) were laid up so that the disposition of the fibres were in the configuration 0°, 90°, 90°, 0°, where the orientations given for the four layers are the direction of the fibres in the successive layers with respect to a fixed axis. The thickness of the individual layers was 125 microns (μm). A film of amorphous polyethersulphone (PES) (Tg=220° C.), 50 μm thick was laid up on one side of the stack of plies and the assembly was consolidated at a temperature of 400° C. by compression moulding at a pressure of 0.7 MPa.

Two elements, 100 mm×100 mm, were cut from this laminate and pressed together with the polyethersulphone surfaces in contact at a temperature of 300° C. and under a pressure of 10.13 bar (10 atmospheres).

A strong bond was obtained indicating that bonded structures of the carbon fibre/polyetheretherketone composite can be obtained without the need to remelt the polymer of the reinforced composite. The most suitable method of providing the polyethersulphone surfaced composite laminate described would be by laying down a film of the polyethersulphone (or other suitable amorphous polymer) on the carbon fibre/polyetheretherketone composite during the production of the prepreg composite while it was at a temperature above the melting point of the matrix polymer.

It should be noted a strong bond was obtained although blends of PEEK and PES do not exhibit a single peak characteristic of the glass transition temperature when examined by DSC and are thus not compatible as hereinbefore defined.

EXAMPLE 2

Three layers of the prepreg material used in Example 1 were laid up with a prepreg of polyethersulphone (PES)/carbon fibre in the configuration 0°, 90°, 90°, 0°, where the last denoted outer layer was the PES prepreg. The layers were laminated together at 400° C. and at a pressure of 0.7 MPa. Elements of these laminates were bonded together, with the PES prepreg surfaces in contact, under pressure and at a temperature of 300° C. A useful bond was obtained.

EXAMPLE 3

The 4-layer laminates of Example 2 were used to provide a surface for a core of polyethersulphone by laying surface layers of the laminate on a foamable polyethersulphone composition with their PES prepreg surfaces contacting the foamable core composition. The foamable core consisted of polyethersulphone. The assembly was held under a pressure sufficient to maintain the system as a solution and the temperature raised to 150° C. The assembly was then allowed to expand by releasing the pressure on the assembly allowing the solvent to boil. As a result foaming of the core took place giving a core foam density of about 200 kg/m³. The foam core was strongly adhered to the reinforced skin laminate.

EXAMPLE 4

Sixteen plies (250 mm×250 mm) of the prepreg material used in Example 1 were laid up in the configuration: 0/45/90/-45/0/45/90/-45/-45/90/45/0/-45/90/45/0 (in degrees).

An additional 75 μm film of amorphous polyetherimide (PEI) (available from General Electric, as Ultem 1000 film) (Tg=213° C.) was laid on top of the laid up prepreg material. The material was placed in a corresponding picture frame, and sandwiched between glazing plates which had been coated with mould release agent. This was then placed in a hydraulic press with a temperature of 400° C. A heat up time of 10 minutes at a pressure of 0.14 MPa (20 psi) and consolidation time of 5 minutes at 0.69 MPa (100 psi) were used. The press and the mould were then cooled at a rate of 10° C./min to ambient temperature.

Two strips of material 100 mm×25 mm were cut from this panel and were arranged in a mould such that polyetherimide surfaces were facing each other with an overlap of 12.5 mm and with the fibre orientation in the abutting surfaces both being at 0°. This mould was placed in a press at 275° C. for 15 minutes at a pressure of 3.45 MPa (500 psi). The press was then cooled at a rate of 10° C./min to ambient.

The resulting test piece was subjected to a standard tensile lap shear test using a cross head speed of 1 mm/min. Strengths of the order of 30 MPa (av. of 5) were achieved.

It should be noted that blends of PEEK and PEI do exhibit a single peak characteristic of the glass transition temperature when examined by DSC and are thus compatible in accordance with a preferred aspect of the invention.

EXAMPLE 5

The procedure of Example 4 was repeated except in that polyetherimide films having a thickness of 125 μm were used. A lap shear strength of 34 MPa was obtained.

EXAMPLE 6

Fifteen 254 mm×254 m (10 in.×10 in.) layers of the prepreg material used in Example 1 but containing 67% continuous carbon fibre by weight were laid up in the configuration:

0/45/90/-45/0/45/90/-45/-45/90/45/0/-45/90/45

(in degrees). An additional layer of unidirectionally reinforced, carbon fibre composite material prepared using a polyetherimide (Ultem 1000, available from General Electric) as the matrix material, and containing 67% continuous carbon fibre reinforcement was laid on top of the final layer having a fibre orientation of 45°, the additional layer being placed so as to have 0° orientation. The material was placed in a corresponding picture frame and sandwiched between glazing plates which had been coated with mould release agent. This was then placed in a hydraulic press at a temperature of 400° C. A heat-up time of 10 minutes at a pressure of 0.14 MPa (20 psi) and a consolidation time of 5 minutes at a pressure of 0.69 MPa (100 psi) were used. Following this the press was cooled at a rate of 10° C./min to ambient.

Strips of material 100 mm×25 mm were cut from this panel and were used to form test pieces as described in Example 4. The resulting test piece was subjected to a standard tensile lap shear test using a cross head speed of 1 mm/min. Strengths were achieved similar in value to those obtained in Examples 4 and 5.

EXAMPLE 7

16 layers of the prepreg material used in Example 1 were laid up according to the procedure of Example 4. An additional layer of polyetherimide (Ultem 1000) was applied to the top layer of prepreg by painting on a solution of the polyetherimide in dichloroethane. A solution concentration of 25% by weight of polymer was used. The composite material was then vacuum dried to remove the dichloroethane. The painted composite material was placed in a corresponding picture frame, and sandwiched between glazing plates which had been coated with mould release agent. This was then placed in a hydraulic press with a temperature of 400° C. A heat up time of 10 minutes at a pressure of 0.14 MPa (20 psi) and a consolidation time of 5 minutes at a pressure of 0.69 MPa (100 psi) were used. Following this the press was cooled at a rate of 10° C./min to ambient.

Strips of material 100 mm×25 mm were cut from this panel and test pieces were prepared as described in Example 4.

The resulting test pieces were found to have lap shear strengths of 10 MPa.

EXAMPLE 8

The procedure of Example 7 was repeated except in that a film of polyetherimide 125 μm thick was placed between the overlapping faces. The test piece was consolidated in a hydraulic press using a temperature of 275° C. and a pressure of 3.45 MPa (500 psi) for 15 minutes. The press was then cooled at a rate of 10° C./min. The resulting specimen had a lap shear strength of 29.5 MPa.

EXAMPLE 9

The procedure of Example 5 was followed to prepare a 16 ply composite faced with a 125 micron thick film of polyetherimide.

Strips of material 100 mm×25 mm were cut from this panel such that the surface fibres ran lengthwise. Two strips were arranged in a tool such that the polyetherimide coated sides faced each other, and overlapped by 125 μm. In addition a 125 μm polyetherimide film strip was placed in the overlapping section. This was placed over a 50 mm×25 mm (2 in.×1 in.) induction coil. The materials were clamped using a pneumatic ram developing a pressure of 0.28 MPa (40 psi). The composite was directly heated using the induction source, which then heated the polyetherimide by conduction. Total time in the field was 150 seconds. After this the material was allowed to cool naturally to 100° C. before pressure was released.

The resulting test piece was subjected to a standard tensile lap shear test using a cross head speed of 1 mm/min. A strength of 35 MPa was achieved.

EXAMPLE 10

A composite panel was prepared as described in Example 6. A 51 mm×51 mm (2 in×2 in.) section of titanium honeycomb was grit blasted, then cleaned by ultrasonic techniques. This was coated with polyetherimide by dipping it into a 25% by weight solution of the polymer in dichloromethane and then vacuum dried to remove the dichloromethane.

The composite panel was also cut into 51 mm×51 mm (2 in×2 in.) sections and arranged in a sandwich with the titanium such that the titanium was between two sheets of composite and the polyetherimide coated faces of the composite in contact with the titanium.

This was placed in a hydraulic press at a temperature of 275° C. for 15 mins. at a pressure of 1.72 MPa (250 psi). The press was cooled at a rate of 10° C./min to ambient.

The resulting structure was a consolidated sandwich of titanium with composite skins. The bond strength (peel strength) between the core and skin was high.

EXAMPLE 11

The procedure of Example 10 was followed except in that an additional 125 micron thick film was placed between the composite and the titanium.

This assembly was placed in a hydraulic press at a temperature of 275° C. for 15 min. at a pressure of 1.72 MPa (250° psi). The press was cooled at a rate of 10° C./min to ambient.

The resulting structure was a consolidated sandwich of titanium honeycomb with composite skins. The bond strengths between the core and skin was very high.

EXAMPLE 12

Eight plies of the material used in Example 1 were laid up in a quasi-isotropic arrangement together with a 75 μm polyetherimide as used in Example 4 were consolidated together according to the procedure of Example 4 into a 257 mm×257 mm (18"×18") panel. The panel was cut in half and assembled on opposite sides of an aramide honeycomb structure (3 PCf, ⅛" cell), which had been dried at 121° C. (250° F.) for 1 hour, with the adherent PEI layers facing the honeycomb structure. The assembled sandwich was placed into a press and brought up to 260° C. (500° F.) at a rate of 11.1° C./min (20° F./min) under a pressure of 0.31 MPa (45 psi) and was held at that temperature and pressure for 30 minutes. It was then cooled at 11.1° C./min (20° F./min) to a temperature of about 149° C. (300° F.) at which point the pressure was released. The sandwich structure was then air cooled to ambient temperature. Strips were cut from the sandwich structure for testing. The bond strengths between the core and the skins were high.

EXAMPLE 13

The procedure of Example 12 was repeated using an HRP glass honeycomb core with similar results.

EXAMPLE 14

The procedures of Examples 12 and 13 were repeated but an additional 50 μm polyetherimide film (Ultem 1000) was interposed between each adherent layer and the aramide and glass cores, respectively. The resultant bond strengths between the respective cores and the skins were very high.

EXAMPLE 15 (COMPARATIVE)

The procedures of Examples 12 and 13 were repeated but with no polyetherimide adherent layer applied to the panels. The resultant bond strengths between the respective cores and the skins were poor.

EXAMPLE 16

Polyetheretherketone polymer of the type used in the "Victrex" APC 2 prepreg of Example 1 was blended with polyetherimide in the ratio of 1:1 in a single screw extruder at 380° C. to form a homogenous blend. The blended materials were pressed into an approximately 100 μm film using a picture frame press at 400° C. and 06.9 MPa.

Sixteen layers (300 mm×300 mm) of the prepreg material used in Example 1 were laid up as in Example 4 together with a film of the blended materials and were placed in a picture frame mould into a hydraulic press at 400° C. A heat up time of 10 minutes at a pressure of 0.14 MPa and a consolidation time of 5 minutes at a pressure of 0.69 MPa were used. The press and the mould were then quench cooled at a rate of 100° C./min to ambient temperature to ensure no crystallisation of the polymers occurred in the surface layers of the panel.

Strips of material 100 mm×25 mm were cut from this panel and used to form test pieces in a manner similar to that described in Example 4 but at a temperature of 330° C. and under a pressure of 1.72 MPa for 15 minutes, the press then being cooled at a rate of 10° C./minute ambient. Under these conditions, the blended polymers of the adherent layer crystallised.

The resulting test piece was subjected to a standard tensile lap shear test using a cross head speed of 1 mm/min. Strengths of the order of 15.95 MPa were achieved.

EXAMPLE 17

Sixteen plies of APC HTA prepreg material (a development material available from Imperial Chemical Industries PLC) which comprises 68% by weight of uniaxially aligned carbon fibres in a matrix of an amorphous polyethersulphone (PES) polymer (Tg 260–265° C.) were laid up together with 75 μm polyetherimide film (Ultem 1000) and were consolidated in accordance with the procedure of Example 4. The resultant panel was cut up into strips (100 mm×25 mm) which were bonded together in accordance with the procedure of Example 8 but at a temperature of 235° C., the thickness of the additional layer of polyetherimide being 75 μm. The resulting specimen had a lap shear strength of 43.08 MPa.

A strong bond was obtained although the PES and PEI do not exhibit a single peak characteristic of the glass transition temperature when examined by DSC and are thus not compatible as hereinbefore defined.

EXAMPLE 18

A number of test strips having a variety of bond thicknesses were prepared in accordance with the procedure described in Example 4. Where necessary, additional polyetherimide films were added to the bond line as described in Example 9 to achieve different bond line thicknesses. Bond thicknesses were determined by polishing the test strip and examining the bond line using a calibrated reflecting light microscope.

Based on the bond strengths achieved, bondline thicknesses are preferably in the range 50 to 500 μm, more preferably in the range 100 to 400 μm and, in particular, in the range 150 to 250 μm.

EXAMPLE 19 (COMPARATIVE)

For comparison, a 32 ply composite was prepared from the prepreg material used in Example 1 substantially as described with reference to Example 4 and machined to obtain samples for testing as described in Example 4. The samples exhibited shear strengths of the order of 34 MPa.

EXAMPLE 20 (COMPARATIVE)

Sixteen plies of the prepreg material used in the Example 1 and consolidated according to the procedure of Example 4. Strips of material 100 mm×25 mm were cut from the resultant panel. The strips were wiped with acetone and allowed to dry before being assembled together with an interposed 125 μm polyetherimide film, the function of the film being to act as a hot melt adhesive. The assembled strips were bonded together and tested under the conditions recited in Example 4. Bond strengths only of 3 MPa were achieved.

We claim:

1. A structural thermoplastic composite material comprising a laminate of (a) a first layer of a fibre reinforced composite comprising a first thermoformable polymer and reinforcing filaments at least 50% by weight of which have a length in excess of 3 mm; and (b) a second adherent layer comprising a second thermoformable polymer selected from the group consisting of a crystalline polymer having a melting point at least 10° C. below that of the first polymer, an amorphous polymer having a glass transition temperature which is at least 10° C. lower than the melting point of the first polymer and an amorphous polymer which is crystallisable by annealing, said second adherent layer having been applied to said first layer at a temperature above the melting point of the first polymer.

2. A structural composite according to claim 1, in which the thermoformable polymer of the adherent layer is compatible with the polymer of the first layer.

3. A structural composite according to claim 1 in which the polymer of the first layer is a crystalline polymer.

4. A structural composite according to claim 1, in which the first layer of fibre reinforced thermoformable composite is reinforced with continuous, aligned filaments.

5. A structural composite according to claim 1, in which the adherent layer is reinforced with continuous, aligned filaments.

6. A structural composite article comprising at least two structural composite materials comprising first and second layers according to claim 1, said materials being bonded together through their respective second layers.

7. A structural composite article according to claim 6, in which the bond strength between said respective bonded second layers is at least 70% of the shear strength of the bulk composite material of the article.

8. A structural composite article comprising a first structural composite material according to claim 1 and a second structural material bonded thereto by the second layer of said first structural composite material.

9. A structural composite article according to claim 8, in which said second structural material is sandwiched between opposed layers of said structural composite material.

10. A structural composite article according to claim 6 in which the thickness of the bond line formed by the adherent layer or layers is about in the range 50 to 500 μm.

11. A structural thermoplastic composite material comprising a laminate of:
(a) a first layer of a fibre-reinforced composite comprising a first thermoformable polymer and reinforcing filaments at least 50% by weight of which have a length in excess of 3 mm; and (b) a second adherent layer comprising a second thermoformable polymer, said second polymer being selected from the group consisting of a crystalline polymer having a melting point at least 10° C. below that of said first polymer, an amorphous polymer having a glass transition temperature which is at least 10° C. lower than the melting point of said first polymer and an amorphous polymer which is crystallisable by annealing;

and comprising an exposed surface; said second layer having been applied to said first layer at a temperature above the melting point of said first polymer.

12. A structural thermoplastic composite material comprising:
   (a) a first fibre-reinforced composite material comprising a first thermoformable polymer and reinforcing filaments at least 50% by weight of which have a length in excess of 3 mm; and
   (b) a second adherent material comprising a second thermoformable polymer, said second polymer being selected from the group consisting of a crystalline polymer having a melting point at least 10° C. below that of said first polymer, an amorphous polymer having a glass transition temperature which is at least 10° C. lower than the melting point of said first polymer and an amorphous polymer which is crystallisable by annealing;

and comprising an exposed surface; said second material having been applied to said first material at a temperature above the melting point of said first polymer.

13. A structural thermoplastic composite material comprising:
   (a) a first fibre-reinforced composite material comprising a first thermoformable polymer and reinforcing filaments at least 50% by weight of which have a length in excess of 3 mm; and
   (b) a second adherent material comprising a second thermoformable polymer, said second polymer being selected from the group consisting of a crystalline polymer having a melting point at least 10° C. below that of said first polymer, an amorphous polymer having a glass transition temperature which is at least 10° C. lower than the melting point of said first polymer and an amorphous polymer which is crystallisable by annealing;

and comprising an exposed surface; said second material having been applied to a surface of said first material at a temperature above the melting point of said first polymer, said composite material being bondable to another material by contacting said exposed surface to a surface of said other material to which it is to be bonded under conditions of heat and pressure insufficient to melt the first polymer.

* * * * *